(12) United States Patent
Tsubaki

(10) Patent No.: US 7,873,207 B2
(45) Date of Patent: Jan. 18, 2011

(54) IMAGE PROCESSING APPARATUS AND IMAGE PROCESSING PROGRAM FOR MULTI-VIEWPOINT IMAGE

(75) Inventor: Hidetoshi Tsubaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 819 days.

(21) Appl. No.: 11/251,266

(22) Filed: Oct. 14, 2005

(65) Prior Publication Data
US 2006/0082644 A1    Apr. 20, 2006

(30) Foreign Application Priority Data
Oct. 14, 2004   (JP)   .............................. 2004-300376

(51) Int. Cl.
*G06K 9/00* (2006.01)
(52) U.S. Cl. .............................. 382/154; 345/7; 348/51
(58) Field of Classification Search ................ 382/154; 348/42, 51, 54; 345/7
See application file for complete search history.

(56) References Cited

U.S. PATENT DOCUMENTS

| | | | | |
|---|---|---|---|---|
| 5,065,236 | A * | 11/1991 | Diner | 348/54 |
| 5,612,709 | A * | 3/1997 | Sudo et al. | 345/8 |
| 5,751,927 | A * | 5/1998 | Wason | 345/419 |
| 6,163,337 | A * | 12/2000 | Azuma et al. | 348/43 |
| 6,233,004 | B1 * | 5/2001 | Tanaka et al. | 348/48 |
| 6,417,880 | B1 * | 7/2002 | Uomori et al. | 348/42 |
| 7,106,274 | B2 * | 9/2006 | Nishihara et al. | 345/6 |
| 7,349,568 | B2 * | 3/2008 | Takemoto et al. | 382/154 |
| 7,466,336 | B2 * | 12/2008 | Regan et al. | 348/50 |
| 2001/0033327 | A1 * | 10/2001 | Uomori et al. | 348/47 |
| 2001/0045979 | A1 * | 11/2001 | Matsumoto et al. | 348/43 |
| 2002/0024592 | A1 * | 2/2002 | Uomori et al. | 348/42 |
| 2002/0030888 | A1 * | 3/2002 | Kleinberger et al. | 359/465 |
| 2003/0026474 | A1 * | 2/2003 | Yano | 382/154 |
| 2003/0043262 | A1 * | 3/2003 | Takemoto et al. | 348/46 |
| 2003/0214459 | A1 * | 11/2003 | Nishihara et al. | 345/6 |
| 2004/0046885 | A1 * | 3/2004 | Regan et al. | 348/333.11 |

(Continued)

FOREIGN PATENT DOCUMENTS

JP     05-030538     2/1993

(Continued)

OTHER PUBLICATIONS

Masao Nakagawa, Hideo Saito and Shinji Ozaaw, "Three Dimensional Reconstruction of Room Environment by Correcting EPI from Image Sequence Taken with Handy Camera", A Publication of the Communications Society, The Institute of Electronics, Information and Communication Engineers, vol. J84-D-II, No. 2, p. 266-275 (Partial English Translation is attached).

(Continued)

*Primary Examiner*—Daniel G Mariam
*Assistant Examiner*—Aklilu k Woldemariam
(74) *Attorney, Agent, or Firm*—Cowan, Liebowitz & Latman, P.C.

(57) ABSTRACT

An image processing apparatus according to this invention includes an information generation unit which generates correspondence information representing correspondence between first images whose viewpoints are different each other, and a selection unit which selects, out of the first images on the basis of the correspondence information, second images whose viewpoints have a predetermined relationship.

3 Claims, 7 Drawing Sheets

U.S. PATENT DOCUMENTS

2004/0066555 A1* 4/2004 Nomura .................. 359/462
2004/0247175 A1* 12/2004 Takano et al. ............... 382/154
2005/0248802 A1 11/2005 Nomura et al.

FOREIGN PATENT DOCUMENTS

| JP | 2001-296499 | 10/2001 |
|----|-------------|---------|
| JP | 2002-077941 A | 3/2002 |
| JP | 2002-077942 | 3/2002 |
| WO | 2004/004350 A1 | 1/2004 |

OTHER PUBLICATIONS

All of the above references were cited in a Feb. 9, 2010 Japanese Office Action (with translation) issued in the counterpart Japanese Patent Application No. 2004-300376.

Partial Human Translation of Foreign Reference JPA 2002-077941 previously disclosed in a Mar. 17, 2010 IDS.

The above foreign references were cited in a May 6, 2010 Japanese Office Action (without translation) issued in the counterpart Japanese Patent Application No. 2004-300376.

* cited by examiner

F I G. 2
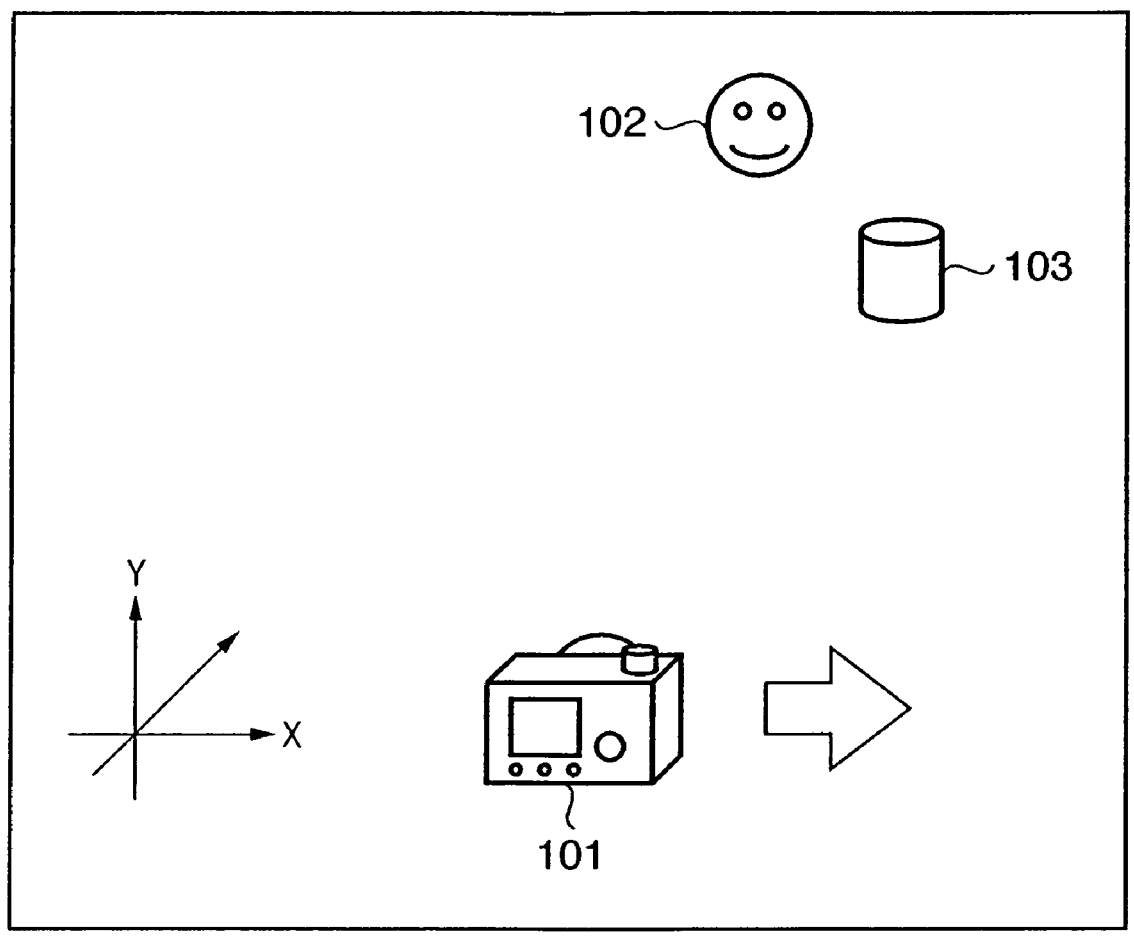

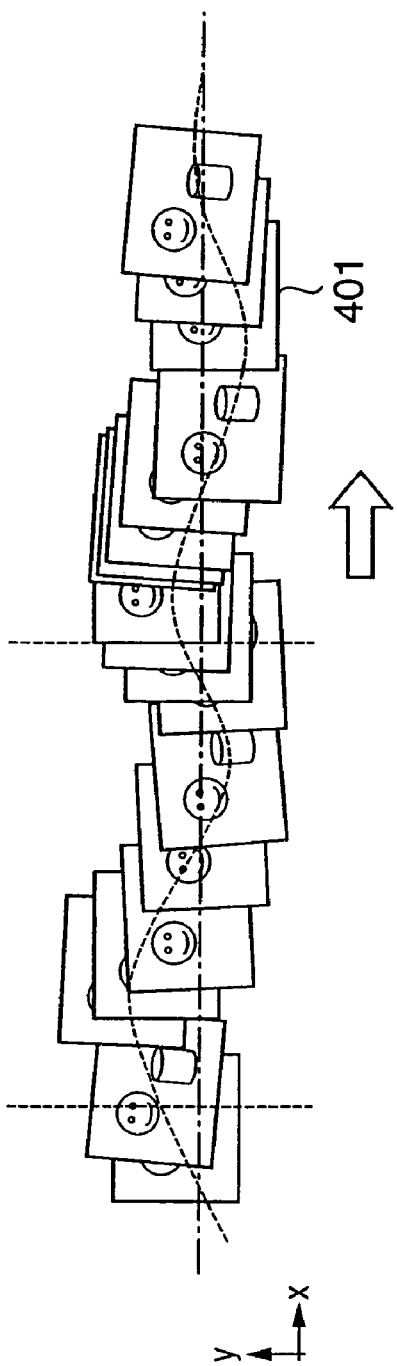
F I G. 4

IMAGE PROCESSING APPARATUS AND IMAGE PROCESSING PROGRAM FOR MULTI-VIEWPOINT IMAGE

FIELD OF THE INVENTION

The present invention relates to a technique of generating a stereoscopic image from a plurality of images (multi-viewpoint image group) which, for example, are photographed from a plurality of viewpoints by a digital still camera or video camera.

BACKGROUND OF THE INVENTION

A model (stereoscopic model) having a stereoscopic effect can be presented by compositing multi-viewpoint images photographed by a digital still camera, video camera, or the like to generate a stereoscopic image, and prompting the user to observe the stereoscopic image via a stereoscopic display device or the like.

Photographing a multi-viewpoint image group conventionally requires facilities (e.g., a rail) for translating a camera, and a special apparatus (e.g., a multi-lens camera) capable of photographing a multi-viewpoint image group without moving the photographing position (Japanese Patent Laid-Open No. 2002-077942).

If a multi-viewpoint image group is photographed without using either the facilities (e.g., a rail) or special apparatus, the line-of-sight direction of each viewpoint image changes or the viewpoint interval becomes unequal owing to vibrations of the camera and an inconstant moving speed of the camera caused by vibration or the like. Composition of these multi-viewpoint images results in a stereoscopic image whose stereoscopic effect unnaturally varies depending on the observation position.

SUMMARY OF THE INVENTION

According to one aspect of the present invention, an image processing apparatus (image processing program) comprises an information generation unit (step) which generates correspondence information representing correspondence between first images whose viewpoints are different to each other, and a selection unit (step) which selects, out of the first images on the basis of the correspondence information, second images whose viewpoints have a predetermined relationship.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a view showing a state in which multi-viewpoint images are input to an image processing apparatus according to the embodiment of the present invention;

FIG. 4 is a view showing variations in the viewpoint positions of photographed multi-viewpoint images due to a camera displacement according to the embodiment of the present invention;

DETAILED DESCRIPTION OF THE PREFERRED EMBODIMENT

An embodiment has been made to overcome the conventional drawbacks, and has as its object to provide an image processing apparatus and image processing program capable of acquiring a proper multi-viewpoint image group without using any special apparatus.

A preferred embodiment of the present invention will be described below with reference to the accompanying drawings.

Figure 1:
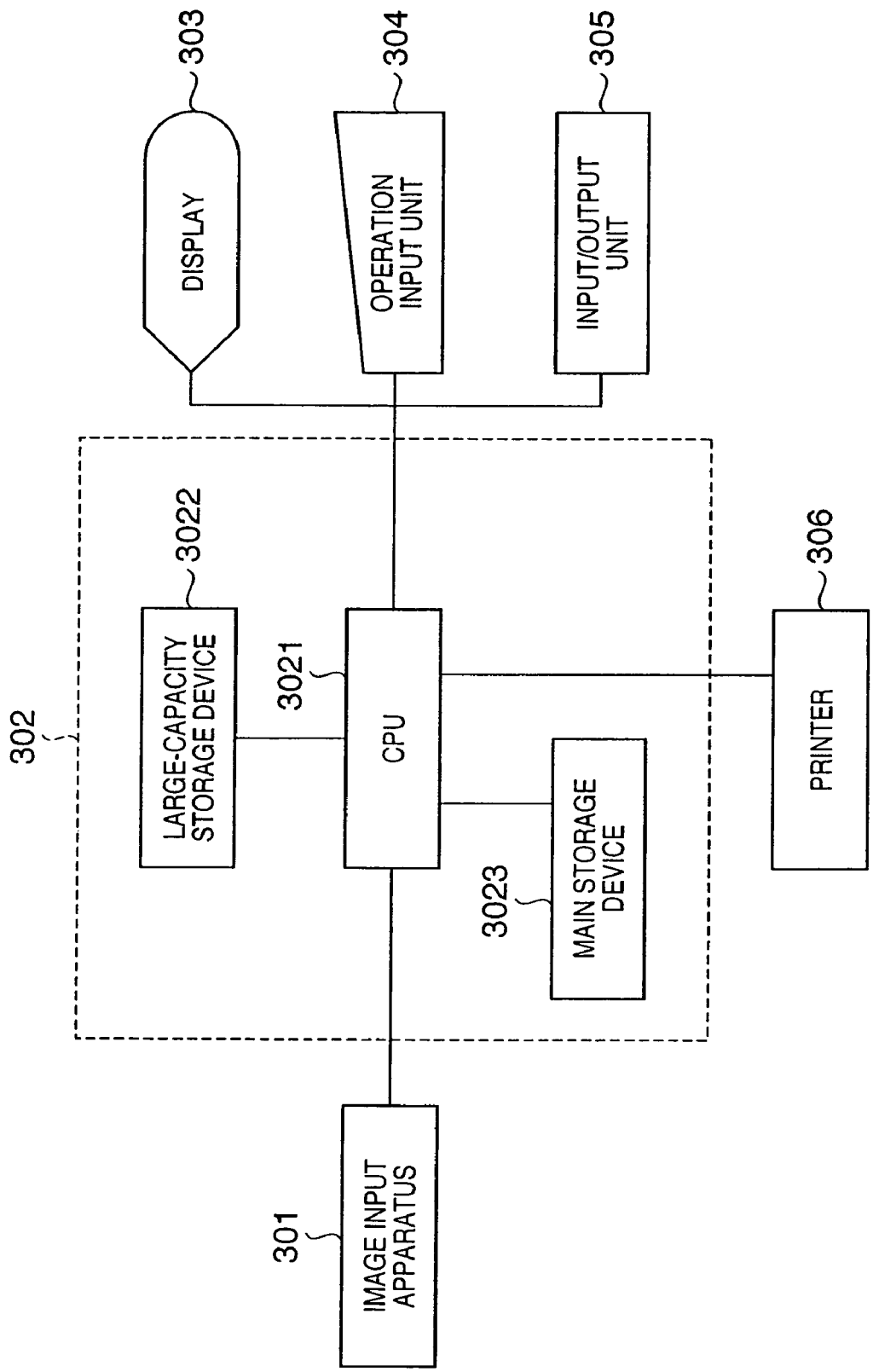
FIG. 1 is a block diagram showing the configuration of an image composition apparatus according to the embodiment of the present invention.

FIG. 1 is a block diagram showing the configuration of a stereoscopic image composition apparatus according to the embodiment of the present invention. Reference numeral 301 denotes an image input apparatus which inputs an image group corresponding to a multi-viewpoint image group to an image composition apparatus. The image input apparatus 301 may also be formed from an input/output apparatus for loading an image file recorded on a permanent recording medium (e.g., a CF card® or smart media®). As an alternate means, the image input apparatus 301 may be formed from an image capturing apparatus (e.g., a digital camera or digital video camera) having an input/output interface, and an image input apparatus (e.g., a scanner or film scanner) which loads image information as digital data from an analog medium. The image input apparatus 301 can be connected to a network, and receive a multi-viewpoint image group which is captured by a remote camera and exists on the network.

Reference numeral 302 denotes an image composition (processing) apparatus which selects at least two multi-viewpoint images from at least two input multi-viewpoint image groups in accordance with the number of viewpoints of a stereoscopic image to be composited, and composites stereoscopic image data. The image composition apparatus 302 can be formed from, e.g., a general-purpose personal computer.

Reference numeral 303 denotes a display (e.g., a CRT display) for a computer or an apparatus which aims to composite a stereoscopic image. The display 303 interactively assists a sequence of acquiring necessary information in compositing a stereoscopic image, and displays the process status, menu, multi-viewpoint images which are selected to composite a stereoscopic image, and the like. Reference numeral 304 denotes an operation input unit (e.g., a mouse, keyboard, or joystick) which allows the user to select a menu while referring to menu items (images) displayed on the display 303.

Reference numeral 305 denotes an input/output unit with an external device. The input/output unit 305 is implemented by a network port (e.g., Ethernet) connected to a network, or a permanent recording medium (e.g., a floppy disk, MO®, ZIP®, or CD-ROM). An input/output device, network terminal apparatus, and the like are connected via the input/output unit 305, and stereoscopic image data, motion parameters between multi-viewpoint images that are calculated by another apparatus, and the like are output/input as a file from/to the image composition apparatus 302. Reference numeral 306 denotes a printer which prints a stereoscopic image composited by the image composition apparatus 302.

The input/output unit 305 is arranged separately from the image input apparatus 301, but the input/output unit of the image input apparatus 301 can also be utilized as that of the image composition apparatus 302 according to the embodiment. It is also possible to input the motion parameter of a camera from an input means (e.g., a keyboard, mouse, or joystick) or visually display the selection result of a subset of multi-viewpoint images on the display 303.

The image composition apparatus 302 comprises a CPU 3021 serving as a central processing unit which controls the overall apparatus, a large-capacity storage device 3022 (e.g., a hard disk) which stores a multi-viewpoint image group loaded from the image input apparatus 301 or the like, a corrected multi-viewpoint image group, and stereoscopic image data, and a main storage device 3023 (e.g., a RAM) which temporarily stores data before pairs of adjacent images are sequentially selected from a multi-viewpoint image group stored in the large-capacity storage device 3022 and only a pair of stereoscopic images subjected to feature point correspondence are rasterized in a main storage area, before calculated corresponding point information and camera displacement information are stored, or before a corrected image is stored in the large-capacity storage device 3022 or output from the input/output unit 305.

The process flow of the image composition apparatus 302 according to the embodiment of the present invention will be explained with reference to FIGS. 2 and 3.

In FIG. 2, reference numeral 101 denotes an image capturing apparatus such as a digital camera; and 102 and 103, objects which compose a scene of a multi-viewpoint image group. In photographing multi-viewpoint images according to the embodiment, the camera 101 ideally moves in a direction indicated by the arrow in FIG. 2 which is perpendicular to the optical axis direction of the camera 101 and parallel to the image scan line direction of the camera. While the viewpoint (photographing position) is changed, multi-viewpoint images larger in number than the number of viewpoints of a stereoscopic image are photographed at very narrow intervals by using a video camera or the sequential shooting function or movie function of the camera, or releasing the shutter of the camera every time the viewpoint moves.

FIG. 4 shows variations in viewpoint when photography is done with a camera which is not fixed by a fixing means or the like but held by hand. When the center of each image is set as a viewpoint and the image is photographed with a camera held by hand, the viewpoint interval between photographed images becomes nonuniform, and the viewpoint position (viewpoint height) slightly varies even in a direction perpendicular to the moving direction due to vibration because the moving speed of the camera is not constant. The line-of-sight direction (photographing direction) similarly varies depending on the camera orientation. To solve these problems, the embodiment executes the following process.

Figure 3:
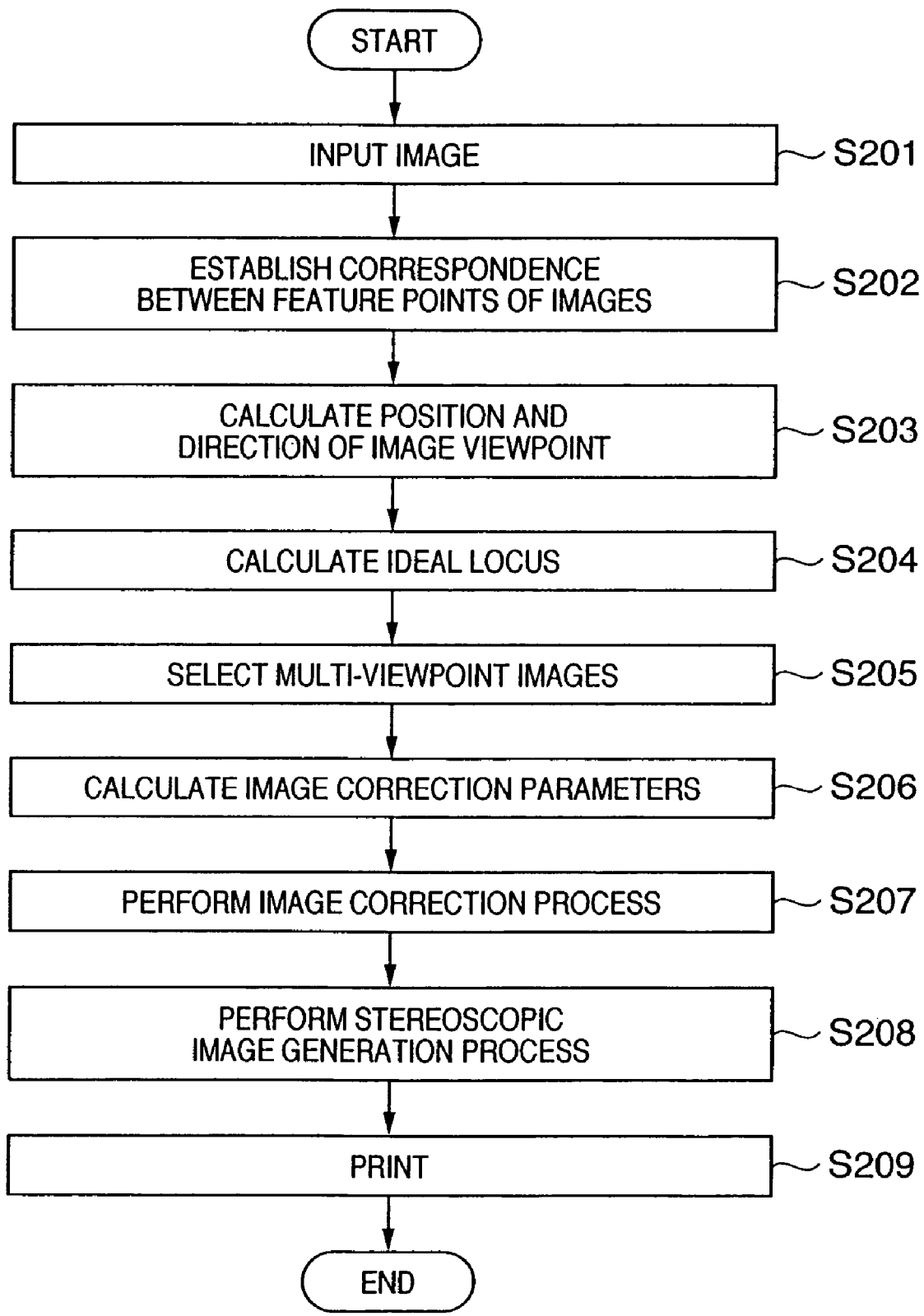
FIG. 3 is a flowchart showing the process flow of a stereoscopic image composition method in the image processing apparatus according to the embodiment of the present invention.

In an image input process in step 201 of FIG. 3, a multi-viewpoint image group photographed by a photographing method as shown in FIG. 1 is input from the image input apparatus 301 and stored in the large-capacity storage device 3022.

In step 202, feature point correspondence is established between adjacent images (first images). At this time, each image undergoes a differential process or the like, and the position, in the image, of a point at which the image luminance value spatially greatly changes is extracted as a feature point. After that, extracted feature points are made to correspond to each other between adjacent images. Correspondence is established so that extracted feature points having similar luminance distributions in the neighboring region correspond to each other. It should be noted that two images, where the corresponding feature points are extracted, are not limited to the two adjacent images. As long as two images include (or are highly probable to include) equivalent feature points, the two images may be used for the extraction. The term "two adjacent images" refers to a primary image and a secondary image, such that the position of the second image viewpoint is the closest to the position of the former image viewpoint, or that the position of the second image viewpoint is the closest in some direction (e.g., the direction of rotation) to the position of the former image viewpoint. The term "to generate correspondence information representing correspondence" refers to making extracted feature points to correspond each other between the images whose viewpoints are different, or to extract the corresponding points from these plural images.

Figure 5:
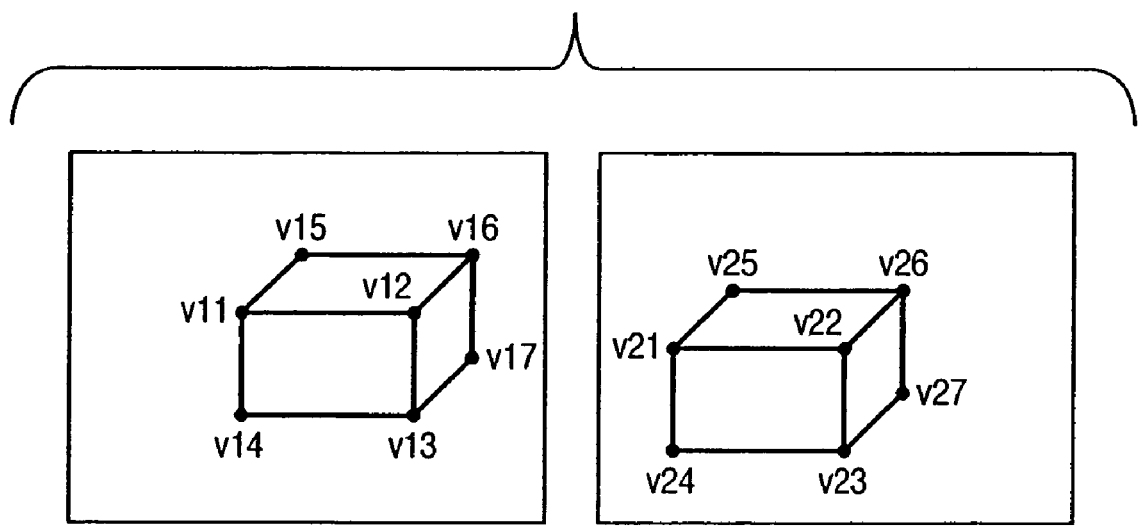
FIG. 5 is a view showing extraction of feature points from multi-viewpoint images according to the embodiment of the present invention.

FIG. 5 shows an example of feature points extracted from adjacent images when the object is a cube. In this case, v11 to v17 and v21 to v27 are extracted feature points. In the embodiment, a simple template matching method using the sum of differences as one region-based method is employed for feature point correspondence. A feature point search process will be explained with reference to FIG. 6.

Figure 6:
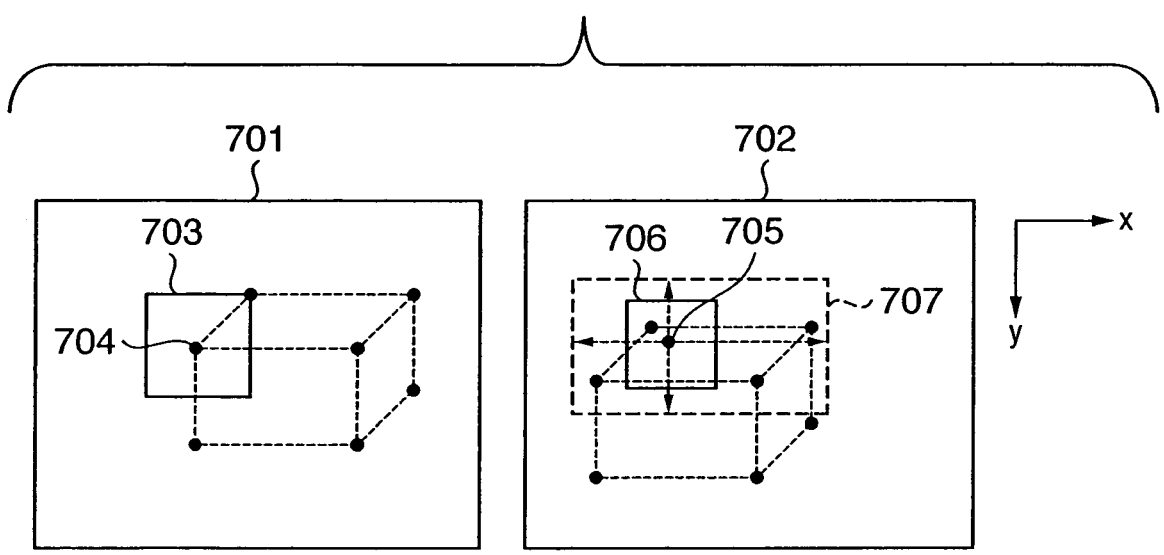
FIG. 6 is a view showing correspondence between feature points on a pair of multi-viewpoint images according to the embodiment of the present invention.

In FIG. 6, of two image data, a left image whose photographing viewpoint position corresponds to the left is defined as a reference image 701, and a right image whose viewpoint position corresponds to the right is defined as a look-up image 702. Template matching is executed using the left image as a reference.

A given feature point is selected from the left image. This point is defined as a reference point 704, and a partial region of a predetermined size centered at the reference point 704 is extracted as a template 703. Look-up points 705 each serving as a feature point present in a predetermined corresponding point search region 707 in the look-up image 702 are sequentially selected from the corresponding point search region 707 which is arbitrarily set in the look-up image 702 in consideration of a rough viewpoint moving amount, variations in viewpoint by vibration, and variations in line-of-sight direction. For a window region 706 of the same size as that of a template centered on the pixel 705 of interest, a correlation value with the template 703 of the left image 701 is calculated.

For example, when the camera 101 moves as shown in FIG. 2 in the embodiment, the search region is often given as a rectangular region having a long side in the horizontal direction of image coordinates, like the region 707 in FIG. 6. In the layout of FIG. 6, feature points v21, v22, v25, and v26 which exist in FIG. 5 also exist in a search region corresponding to v11. A point corresponding to a point of interest is determined to be a feature point having the largest correlation value. When the correlation value at the corresponding point position is smaller than a predetermined value, when the difference between a correlation value at the corresponding point position and the second smallest correlation value is smaller than a predetermined Value, or when a change in correlation value near the corresponding point position is smaller than a predetermined value, the reliability of the corresponding point search process is considered to be poor, and no correspondence is established for the point.

By the corresponding point search process, correspondence information based on template matching of the reference image 701 is obtained. The above correspondence process is repeated for the remaining feature points in the reference image 701. Note that the same process may be done by defining a right image as a reference image and a left image as a look-up image reversely. When correspondence is established on the basis of both the left and right image references, the correspondence results of feature points may be corrected using symmetry of correspondence information so that feature points have one-to-one correspondence. Feature point correspondence is sequentially established between the remaining adjacent images.

In step 203 of FIG. 3, a relative camera displacement between adjacent images, i.e., the position and/or direction of the image viewpoint is calculated on the basis of the correspondence information obtained by feature point correspondence between images in step 202. In this step, it may be so arranged that what should be calculated is at least one of the positions and the direction of the image viewpoint.

First, a fundamental matrix F representing an epipolar geometry between images is obtained. Letting (u,v) be the position of a feature point on one image of a corresponding point, and (u',v') be the position of a feature point on the other corresponding image, these positions are replaced with homogeneous expressions: $x = (u,v,1)$ and $x' = (u',v',1)$. An epipolar constraint $x'Fx = 0 \ldots (1)$ is used, and F can be calculated by the least-square method using all correspondence results (F is a 3×3 matrix).

Then, the fundamental matrix F is decomposed to obtain a 3D rotation matrix R representing a change in direction, and a motion vector t representing a change in viewpoint position. R and t are also sequentially obtained between the remaining adjacent images. Camera displacements obtained between adjacent images are linked to attain all photographing viewpoints along the photographing optical axes of photographed images, and the relationship between viewpoint directions.

When the internal parameter of each multi-viewpoint image upon photographing multi-viewpoint images, especially the focal length which varies upon zooming or the like is unknown among the calculated camera displacements, the absolute amount of the motion vector among the camera displacements is ambiguous and cannot be calculated from two images. In this case, the motion vector is desirably calculated again using feature point correspondence between three images.

Figure 7A:
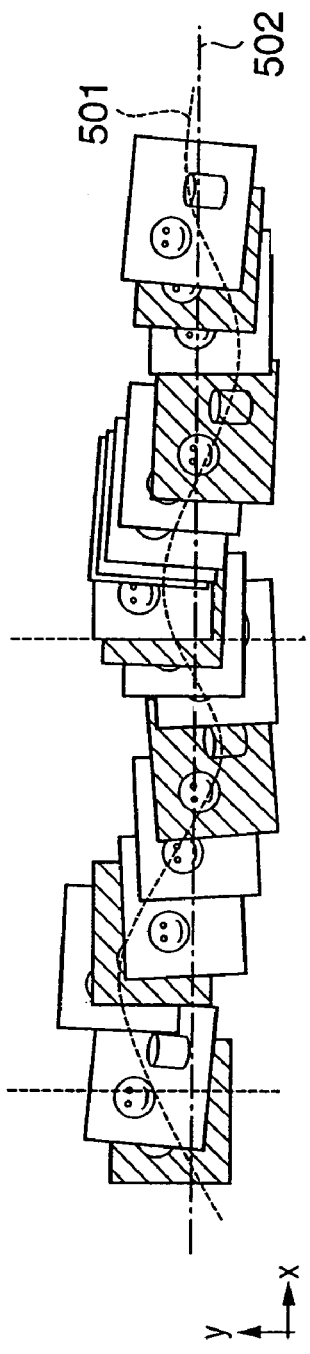
FIGS. 7A to 7C are views showing selection of multi-viewpoint images from a multi-viewpoint image group and a correction process for them according to the embodiment of the present invention.

In step 204 of FIG. 3, an ideal locus calculation process is executed. An ideal locus as an approximate or typical viewpoint, and an ideal line-of-sight direction are determined using a whole viewpoint and line-of-sight direction which are based on a given photographed image and obtained by coupling the relative viewpoint positions and line-of-sight directions (photographing positions and photographing directions) of image viewpoints obtained in step 203. As for the viewpoint position, a straight line which is nearest to each viewpoint position in the 3D space is obtained by approximate calculation such as the least-square method, and thereby an ideal camera locus free from the influence of vibration or the like can be calculated. A chain line 502 in FIG. 7A represents a calculated ideal camera locus. As for the line-of-sight direction, an ideal line-of-sight direction can be obtained by the least-square method or the like because multi-viewpoint images are photographed in a predetermined line-of-sight direction.

In step 205, multi-viewpoint images corresponding to the number of viewpoints of a stereoscopic image are selected from a multi-viewpoint image group on the basis of the ideal locus and ideal line-of-sight direction which are determined from the correspondence information. Images corresponding to the number of viewpoints of a stereoscopic image at almost equal intervals along the ideal locus 502 calculated in step 204, i.e., images which are arranged at equal intervals (almost constant) in almost the same line-of-sight direction, like images in FIG. 7A (colored images in FIG. 7A) are selected.

In other words, a multi-viewpoint image group whose viewpoint intervals are almost equal along the ideal locus and ideal line-of-sight direction (typical information) that have been calculated on the basis of correspondence information, i.e., whose intervals fall within a predetermined range is selected. More specifically, a multi-viewpoint image group (second images) is selected which satisfies a relationship in which the positions of the viewpoints in a direction perpendicular to the ideal locus of the viewpoint substantially coincide with each other (fall within a predetermined range with respect to the ideal locus), or fall within a predetermined range with respect to the ideal line-of-sight direction.

Figure 7B:
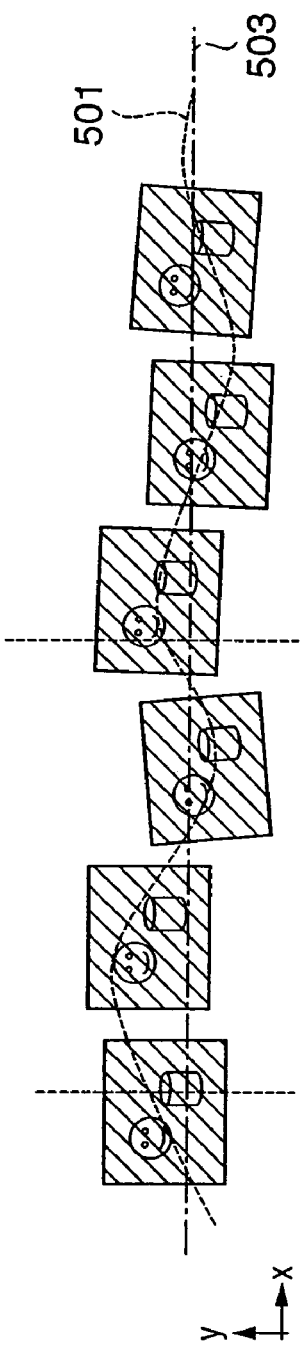

The viewpoint interval is changed larger in order to increase a parallax to be presented for a stereoscopic image, or smaller in order to decrease the parallax. Accordingly, as shown in FIG. 7B, a subset of multi-viewpoint images equal in number to the number of viewpoints of a stereoscopic image is selected from the multi-viewpoint image group.

In calculation of image correction parameters in step 206, variations (difference) in line-of-sight direction from the ideal viewpoint locus and ideal line-of-sight direction (typical information) of multi-viewpoint images that have been obtained by calculation of the ideal locus in step 204 are calculated again for the subset of multi-viewpoint images which have been selected in selection of multi-viewpoint images in step 205. Correction parameters for decreasing deviations of multi-viewpoint images from the ideal locus and ideal line-of-sight direction are obtained. A chain line 503 in FIG. 7B represents a recalculated ideal camera locus for the subset of multi-viewpoint images. In FIGS. 7A and 7B, a thin line 501 corresponds to an actual camera locus.

Correction process parameters are calculated from differences (errors) from the ideal viewpoint and line-of-sight direction. As for a deviation from the ideal line-of-sight direction of the camera, a line-of-sight conversion parameter expressed by a 3D rotation matrix is calculated to obtain a correction amount.

The influence on an image by a deviation of the viewpoint locus of the camera from an ideal locus depends strictly on the depth. When the depth of each image point is unknown, it is difficult to correct a deviation. However, it is considered that a deviation in the direction of depth (Z) from the ideal locus of the viewpoint decreases along with camera movement in the ideal line-of-sight direction. Thus, a deviation is approximately corrected by translation on the image plane, like the embodiment.

Figure 7C:
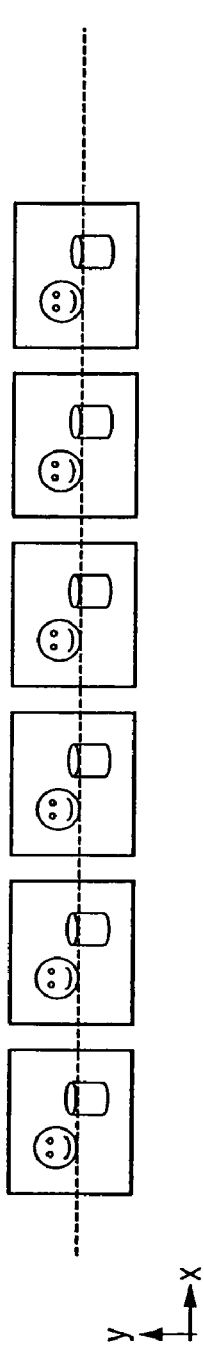

In an image correction process in step 207 of FIG. 3, affine transformation and projective transformation are executed on the basis of the image correction parameters attained by calculation of image correction parameters in step 206, and multi-viewpoint images undergo geometric image correction. Geometric image correction can provide corrected multi-viewpoint images equal in number to the number of viewpoints of a stereoscopic image as if images were photographed while the line-of-sight direction is kept unchanged and the camera is moved at equal intervals in a direction perpendicular to the optical axis direction of the camera and parallel to the image scan line direction, as shown in FIG. 7C.

The flow advances to a stereoscopic image composition process in step 208. Multi-viewpoint images which have been corrected so that the viewpoint and line-of-sight direction change smoothly between sequences by the correction process (step 207) are composited into a stereoscopic image. The stereoscopic image is printed by the printer 306, or output as data (file) via the input/output unit 305.

A stereoscopic image composition process using a lenticular plate for an observation device is performed by compositing a stereoscopic stripe image from a multi-viewpoint image group. At this time, stereoscopic stripe image is composited so that pixels at the same coordinates on images of the multi-viewpoint image group are arranged as adjacent pixels in accordance with the viewpoint arrangement of the images. Letting $P_{jmn}$ (m and n are the indices of horizontal and vertical pixel arrangements) be a pixel value at the jth viewpoint, the jth image data is given by the following 2D arrangement:

$P_{j00}\ P_{j10}\ P_{j20}\ P_{j30}$ $P_{j01}\ P_{j11}\ P_{j21}\ P_{j31}$ $P_{j02}\ P_{j12}\ P_{j22}\ P_{j32}$ (Arrangement 1)

In the composition process, an image at each viewpoint is decomposited into the stripes of respective lines in the vertical direction, and the stripes are composited by the number of viewpoints in an order opposite to that of viewpoint positions. The image is, therefore, composited into the following stripe image:

$P_{N01} \ldots P_{201}\ P_{101}\ P_{N11} \ldots P_{211}\ P_{111}\ P_{N21} \ldots P_{221}.P_{121}$ $P_{N02} \ldots P_{202}\ P_{102}\ P_{N12} \ldots P_{212}\ P_{112}\ P_{N22} \ldots P_{222}.P_{122}$ $P_{N03} \ldots P_{203}\ P_{103}\ P_{N13} \ldots P_{213}\ P_{113}\ P_{N23} \ldots P_{223}.P_{123}$ (Arrangement 2)

This arrangement represents an image corresponding to a positional relationship in which viewpoint 1 is set at the left end and viewpoint N is set at the right end. Viewpoint positions are arranged in an opposite order because in observation through the lenticular plate (lenticular lens), an image is observed reversely in the horizontal direction at one pitch. When original multi-viewpoint images are N viewpoint images each with a size of H×v, the size of a stereoscopic stripe image is X(=N×H)×v.

The pitch of the lenticular plate and the pitch of the image are adjusted for the stereoscopic stripe image. N pixels at RP (dpi) exist at one pitch, and thus one pitch=N/RP (inch). Since the pitch of the lenticular lens is RL (inch), the pitches are adjusted by multiplying the image by RL×RP/N in the horizontal direction. When the aspect ratio is to be kept unchanged, the number of pixels in the vertical direction is (RL×RP/N)×Y, and the image has a vertical size of (RL×RP× Y)/(N×v). In this case, the print resolution is RP (dpi), the print size is XP×YP, the size of an image to be printed is X(RP×XP)×Y(RP×YP) pixels, and the pitch of the lenticular plate is RL (inch).

The above-described horizontal and vertical scaling processes are done for a stereoscopic stripe image, generating print image data. The scaling process is achieved by bilinear interpolation or the like.

In a printing process of step 209, a stereoscopic image composited by the stereoscopic image composition process in step 208 is printed. Finally, an optical member such as the lenticular plate is superposed on the print result to observe the print result. The user can observe the stereoscopic image which is made up of multiple viewpoints and is kept natural even when the viewpoint moves.

According to the embodiment, correspondence information is calculated between first images, and multi-viewpoint images (second images) having a predetermined relationship with an approximate ideal locus and ideal line-of-sight direction (typical information) which are determined from the correspondence information are selected. By compositing the first images without using any special apparatus in photographing the first images, a multi-viewpoint image group capable of obtaining a stereoscopic image almost free from variations in stereoscopic effect regardless of the observation position can be acquired.

In other words, even when a multi-viewpoint image group is photographed while the camera is manually moved to change the viewpoint without using any special apparatus, a necessary number of images for generating a multi-viewpoint stereoscopic image are selected so that a parallax for presenting a proper stereoscopic effect on the stereoscopic image is attained and the viewpoint varies at an almost constant speed. Further, an image is corrected using image correction parameters based on an ideal locus and ideal line-of-sight direction (typical information) which are calculated from correspondence information.

The embodiment can, therefore, implement an image processing apparatus capable of compositing a stereoscopic image which provides smooth variations in stereoscopic effect by motion parallax and binocular parallax.

The image processing apparatus can composite a stereoscopic image which has natural motion parallax and natural variations in stereoscopic effect by binocular parallax upon a change in viewpoint even when a printed multi-viewpoint stereoscopic image is observed.

The embodiment has explained a stereoscopic image composition method in accordance with the pixel arrangement when a lenticular lens sheet is utilized for a stereoscopic image. The present invention may also adopt a stereoscopic image presentation scheme of similarly compositing a stereoscopic image from multi-viewpoint images, such as a scheme using an oblique lenticular sheet, parallax stereogram, or holographic stereogram.

The present invention may be applied to a system including a plurality of devices or an apparatus formed by a single device. The present invention is also implemented when a storage medium which stores software program codes for implementing the functions of the above-described embodiment is supplied to a system or apparatus, and the computer (or the CPU or MPU) of the system or apparatus reads out and executes the program codes stored in the storage medium. The present invention is not limited to the above-described embodiment.

In this case, the program codes read out from the storage medium implement the functions of the above-described embodiment, and the storage medium which stores the program codes constitutes the embodiment. The storage medium for supplying the program codes includes a floppy disk, hard disk, optical disk, magnetooptical disk, CD-ROM, CD-R/RW, magnetic tape, nonvolatile memory card, and ROM. The functions of the above-described embodiment are implemented when the computer executes the readout program codes. Also, the present invention includes a case wherein an OS or the like running on the computer performs some or all of actual processes on the basis of the instructions of the program codes and thereby implements the functions of the above-described embodiment.

Furthermore, the present invention includes a case wherein, after the program codes read out from the storage medium are written in the memory of a function expansion board inserted into the computer or the memory of a function expansion unit connected to the computer, the CPU of the expansion board or expansion unit performs some or all of actual processes for the expansion function on the basis of the instructions of the program codes and thereby implements the functions of the above-described embodiment.

According to the present invention, second images having a predetermined relationship with the viewpoint and line-of-sight direction are selected on the basis of correspondence information between first images. Thus, without using any special apparatus in photographing the first images, a proper multi-viewpoint image group, e.g., image group capable of obtaining a stereoscopic image almost free from variations in stereoscopic effect regardless of the observation position can be acquired.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-300376 filed on Oct. 14, 2004, which is hereby incorporated by reference herein.

What is claimed is:

1. An image processing apparatus comprising:
one or more processors implemented in the following states:
an information generation process which searches for points corresponding to each other between a plurality of first images, which are photographed by a camera from a plurality of viewpoints that are different from each other, and generates correspondence information representing the corresponding points;
a selection process which selects, out of the plurality of first images, a plurality of second images, and
an image generation process which composites the plurality of second images to acquire a third image for stereoscopic vision,
wherein the selection process determines, on the basis of the plurality of first images and the correspondence information, the positions of viewpoints and the line-of-sight directions for viewing a stereoscopic image of the third image, and
the selection process selects, on the basis of the determined position of viewpoints and line-of-sight direction, the plurality of second images whose viewpoint intervals are substantially coincide each other.

2. A non-transitory computer-readable storage medium storing a program for causing a computer to execute the following:
a first step of searching for points corresponding to each other between a plurality of first images, which are photographed by a camera from a plurality of viewpoints that are different from each other, and generating correspondence information representing the corresponding points;
a second step of selecting, out of the plurality of first images, a plurality of second images, and
a third step of compositing the plurality of second images to acquire a third image for stereoscopic vision,
wherein, in the second step, the positions of viewpoints and line-of-sight directions for viewing a stereoscopic image of the third image is determined on the basis of the plurality of first images and the correspondence information, and
in the second step, the plurality of second images whose viewpoint intervals are substantially coincide each other on the basis of the determined position of viewpoints and line-of-sight direction.

3. The apparatus according to claim 1, wherein the image generation process translates the plurality of second images in the line-of-sight direction in order to correct a deviation of the positions of the plurality of second images from the positions of viewpoints.

* * * * *